US011847360B2

(12) United States Patent
Nakamura

(10) Patent No.: US 11,847,360 B2
(45) Date of Patent: Dec. 19, 2023

(54) INFORMATION PROCESSING APPARATUS, INFORMATION PROCESSING SYSTEM, METHOD OF CONTROLLING THE INFORMATION PROCESSING APPARATUS, AND STORAGE MEDIUM FOR CONNECTING TO PREDETERMINED NETWORK

(71) Applicant: Canon Kabushiki Kaisha, Tokyo (JP)

(72) Inventor: Akira Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/158,573

(22) Filed: Jan. 24, 2023

(65) Prior Publication Data
US 2023/0259312 A1 Aug. 17, 2023

(30) Foreign Application Priority Data

Feb. 15, 2022 (JP) ................................ 2022-021431

(51) Int. Cl.
*G06F 3/12* (2006.01)
(52) U.S. Cl.
CPC ............ *G06F 3/121* (2013.01); *G06F 3/1204* (2013.01); *G06F 3/1225* (2013.01); *G06F 3/1236* (2013.01); *G06F 3/1287* (2013.01); *G06F 3/1292* (2013.01)
(58) Field of Classification Search
CPC ...... G06F 3/121; G06F 3/1204; G06F 3/1225; G06F 3/1236; G06F 3/1292; G06F 3/1287

USPC ........................................................ 358/1.15
See application file for complete search history.

(56) References Cited

U.S. PATENT DOCUMENTS

| 10,908,861 | B2 | 2/2021 | Tanaka | |
| 11,379,160 | B2 * | 7/2022 | Tomida | G06F 3/1267 |
| 2016/0224290 | A1 * | 8/2016 | Suzuki | G06F 3/1292 |
| 2020/0073608 | A1 * | 3/2020 | Tanaka | G06F 3/1272 |
| 2020/0120235 | A1 * | 4/2020 | Ando | G06F 3/1292 |

FOREIGN PATENT DOCUMENTS

JP 2020035378 A 3/2020

* cited by examiner

*Primary Examiner* — Allen H Nguyen
(74) *Attorney, Agent, or Firm* — Venable LLP

(57) ABSTRACT

An information processing apparatus has a plurality of communication units capable of communicating with an image processing apparatus. The information processing apparatus obtains information of an image processing apparatus connected via at least one communication unit of the plurality of communication units and is not connected to the Internet, and it determines whether it is necessary to connect the image processing apparatus to a predetermined network connected to the Internet based on the obtained information. In a case where it is determined that it is necessary to connect, the information processing apparatus causes the image processing apparatus to execute processing for connecting to the predetermined network via the at least one communication unit, and in a case that the processing for connecting completes, registers the image processing apparatus to a service intermediated by the predetermined network.

17 Claims, 9 Drawing Sheets

FIG. 8

SELECT PRINTER

| MODEL NAME | SERIAL NUMBER |
|---|---|
| MODEL XXX | ABCD12345 |
| MODEL YYY | EFGH678090 |
| MODEL ZZZ | IJKL12345 |

REGISTRATION

FIG. 9

SELECT ACCESS POINT

| SSID | ENCRYPTION METHOD |
|---|---|
| AP0001 | WPA/WPA2 |
| AP0002 | WPA3 |
| AP0003 | OPEN (NONE) |

INPUT PASSWORD

CONNECTION

INFORMATION PROCESSING APPARATUS, INFORMATION PROCESSING SYSTEM, METHOD OF CONTROLLING THE INFORMATION PROCESSING APPARATUS, AND STORAGE MEDIUM FOR CONNECTING TO PREDETERMINED NETWORK

BACKGROUND OF THE INVENTION

Field of the Invention

The present invention relates to an information processing apparatus, an information processing system, a method of controlling the information processing apparatus, and a storage medium.

Description of the Related Art

Flat rate Web services in which, for example, an image forming apparatus (referred to as a printer) is lent to a user and consumables can be provided and replaced for a flat rate in addition to a usage charge for a printer main unit have become available as Internet Web services. In these Web services, an automatic ordering system for consumables is used in which the printer notifies a Web server of remaining amounts of consumables, such as ink and paper, and the Web server automatically places an order for consumables to a store based on consumables remaining amount information.

Japanese Patent Laid-Open No. 2020-35378 describes a method of registering a printer to a Web service using an information processing apparatus (such as a PC) even when the printer is not connected to the Internet when registering to the Web service.

However, in the above prior art, in order to start a Web service, the printer must be connected to the Internet, and so the user themselves needs to perform appropriate processing for connecting the user's printer to the Internet and the operation is complicated. Some of the above-mentioned flat rate Web services restrict the use of the printer when the printer is not registered to the Web service, and in order to use the printer, it may be necessary to perform processing for connecting the printer to the Internet and registering the printer to the Web service. This is for successively monitoring usage statuses of consumables via the Web in order to prevent improper obtainment of consumables for resale or the like. Also, processing for confirming whether the printer can be registered to a Web service and confirming the state of registration to the Web service when registering a printer to the Web service using a PC has not been considered, and so a registration error may occur when the printer does not support the Web service or has already been registered to the Web service.

SUMMARY OF THE INVENTION

Embodiments of the present disclosure eliminate the above-mentioned issues with conventional technology.

A feature of embodiments of the present disclosure is to provide a technique for easily setting up an image processing apparatus whose use is premised upon an Internet connection and registration with a service via the Internet regardless of a method of connecting an information processing apparatus and the image processing apparatus.

According to a first aspect of embodiments of the present disclosure, there is provided an information processing apparatus comprising: a plurality of communication units capable of communicating with an image processing apparatus; one or more memories storing instructions; and one or more processors that execute the instructions to: obtain information of an image processing apparatus connected via a communication unit that is at least one communication unit of the plurality of communication units and is not connected to the Internet; determine whether it is necessary to connect the image processing apparatus to a predetermined network connected to the Internet based on the obtained information; in a case where it is determined that it is necessary to connect to the predetermined network, cause the image processing apparatus to execute processing for connecting to the predetermined network, via the at least one communication unit; and in a case that the processing for connecting to the predetermined network by the image processing apparatus completes, register the image processing apparatus to a service intermediated by the predetermined network.

According to a second aspect of embodiments of the present disclosure, there is provided an information processing system including an image processing apparatus, a server, and an information processing apparatus, the information processing apparatus comprising: a plurality of communication units capable of communicating with the image processing apparatus; one or more first memories storing instructions; and one or more first processors that execute the instructions being configured to: obtain information of an image processing apparatus connected via a communication unit that is at least one communication unit of the plurality of communication units and is not connected to the Internet; determine whether it is necessary to connect the image processing apparatus to a predetermined network connected to the Internet based on the obtained information; in a case where it is determined that it is necessary to connect to the predetermined network, cause the image processing apparatus to execute processing for connecting to the predetermined network, via the at least one communication unit; and when the processing for connecting to the predetermined network by the image processing apparatus completes, register the image processing apparatus to a service intermediated by the predetermined network, and the image processing apparatus comprising: one or more second memories storing instructions; and one or more second processors that execute the instructions being configured to: upon accepting an instruction of the processing for connecting to the predetermined network, search for an access point, and notify the information processing apparatus of a result of the search; and establish a wireless connection with a retrieved access point in accordance with an instruction of a wireless setting from the information processing apparatus, wherein when the image processing apparatus successfully establishes the wireless connection, the information processing apparatus registers the image processing apparatus to the server.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 8 is a diagram illustrating an example of a screen for displaying a list of printers retrieved by the PC according to the first embodiment.

FIG. 9 is a diagram illustrating an example of a screen for selecting an access point to be displayed on the display unit by the PC according to the first embodiment.

DESCRIPTION OF THE EMBODIMENTS

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure.

Hereinafter, a description will be given using a printer for printing an image as an example of an image processing apparatus according to the embodiments. Further, a description will be given using a PC as an example of an information processing apparatus for performing wireless setting processing for the image processing apparatus according to the embodiments. However, the present invention is not limited to this, and the information processing apparatus may be a smartphone, and processing of the information processing apparatus according to the embodiments may be applied to various devices, such as a digital camera.

First Embodiment

Figure 1:
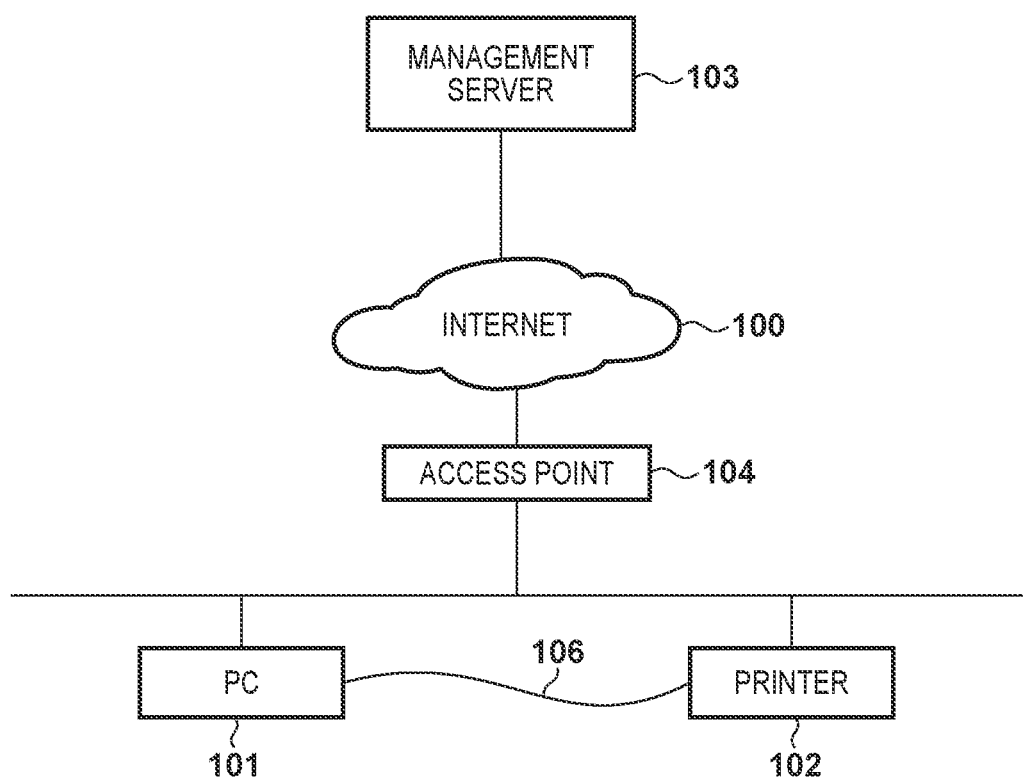
FIG. 1 is a diagram illustrating an example of a configuration of an information processing system according to a first embodiment of the present invention.

FIG. 1 is a diagram illustrating an example of a configuration of an information processing system according to a first embodiment of the present invention.

The information processing system includes a PC 101 which is an information processing apparatus, a printer 102 which is an image processing apparatus, and a management server 103. The PC 101 and the printer 102 can be connected to the Internet 100 via an access point 104. Here, the access point 104 is an external access point external to the PC 101 and the printer 102 and is, for example, a wireless local area network (LAN) router. The management server 103 is connected to the Internet 100. The printer 102 and the PC 101 can communicate with each other via a universal serial bus (USB) cable 106. That is, the printer 102 can be connected to the Internet 100 via the access point 104 and is directly connected with the PC 101 without going through the access point 104 or the Internet 100. The printer 102 and the PC 101 can also communicate with each other via the access point 104. In the first embodiment, a description will be given using the USB as an example of a direct connection interface between the PC 101 and the printer 102; however, the direct connection interface may be another direct connection interface, such as Wi-Fi Direct® or Bluetooth Low Energy®.

The management server 103 manages information transmitted from the printer 102. Control of each communication is performed through a protocol, such as HTTP or XMPP.

Figure 2:
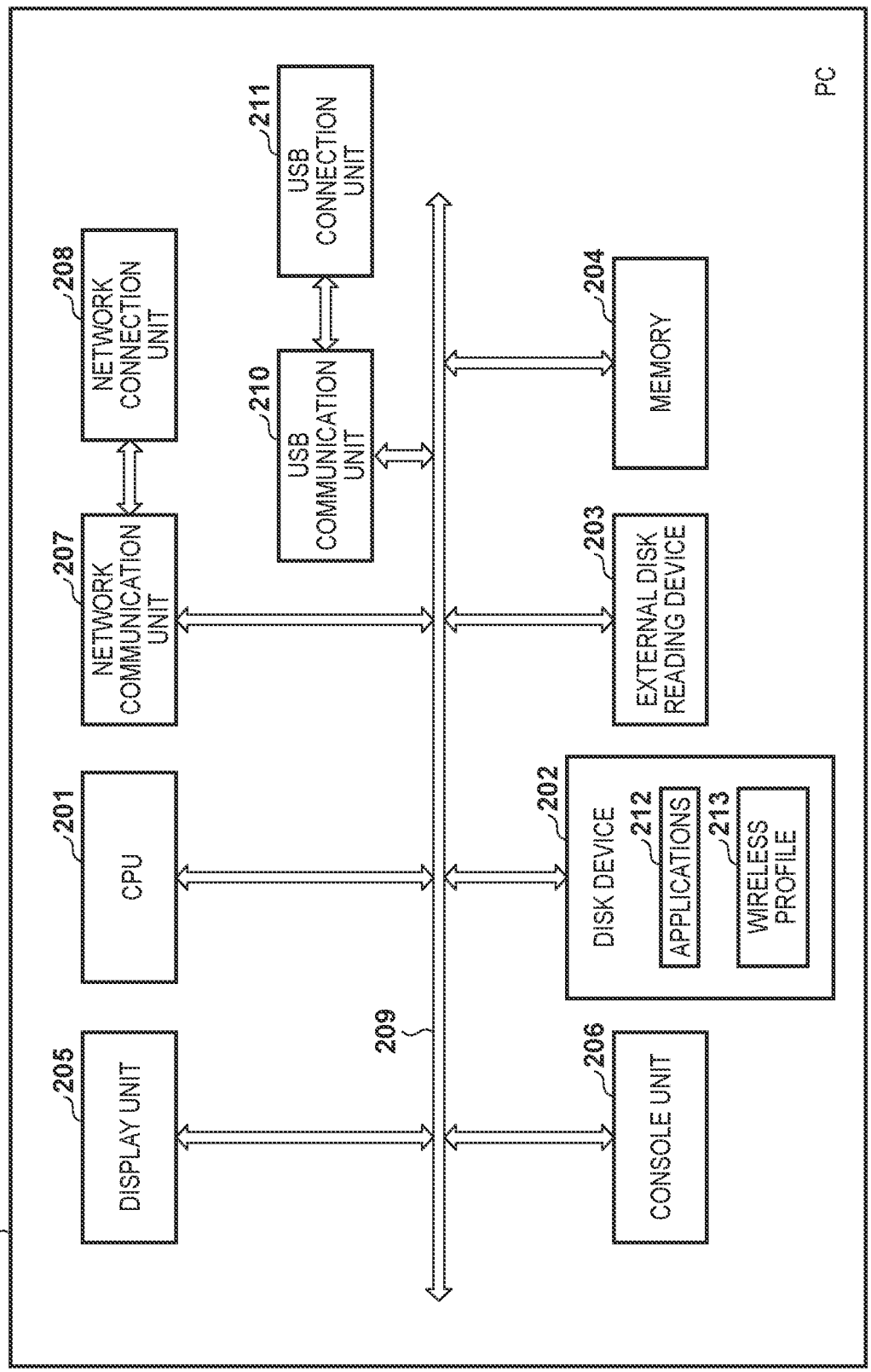
FIG. 2 is a block diagram for explaining an example of a hardware configuration of a PC according to the first embodiment.

FIG. 2 is a block diagram for explaining an example of a hardware configuration of the PC 101 according to the first embodiment.

The PC 101 includes a CPU 201, a disk device 202, an external disk reading device 203, a memory 204, a display unit 205, and a console unit 206. Further, the PC 101 includes a network communication unit 207, a network connection unit 208, a USB communication unit 210, and a USB connection unit 211.

The CPU 201 is a central processing unit for controlling each unit of the PC 101. The disk device 202 stores applications 212 and an OS to be read out by the CPU 201 as well as various files, such as a wireless profile 213, which will be described later. The external disk reading device 203 is, for example, a device for reading out data, such as a file stored in an external storage medium, such as an SD card. The memory 204 includes a RAM or the like and is used for the CPU 201 to, for example, temporarily store and buffer data as needed. The display unit 205 includes, for example, a liquid crystal display unit and displays various information. The console unit 206 includes a keyboard, a pointing device, and the like for the user to perform various input operations. The network communication unit 207 connects to the access point 104 via the network connection unit 208. In the present embodiment, the access point 104 is connected to the Internet 100. Therefore, by the access point 104 and the network connection unit 208 connecting, the network communication unit 207 can be connected to the Internet 100 via the network connection unit 208 and perform various kinds of communication. The network communication unit 207 supports a wired LAN, a wireless LAN, and the like. In the present embodiment, the wireless LAN is specifically a network configured by an IEEE 802.11 series communication standard. That is, the network communication unit 207 connects and communicates with the access point using the IEEE 802.11 series communication standard. When the network communication unit 207 supports the wired LAN, the network connection unit 208 is a connector for connecting a wired LAN cable, and when the network communication unit 207 supports the wireless LAN, the network connection unit 208 is an antenna. The USB communication unit 210 is connected with various peripheral devices (e.g., the printer 102) via the USB connection unit 211 and performs various kinds of communication with the peripheral devices. Each of the above-described units corresponding to reference numerals 201 to 207 and 210 are connected to each other via a bus 209. In the first embodiment, a description will be given using the PC 101 as an example of the information processing apparatus; however, the present invention is not limited to this. For example, an information processing terminal, such as a smartphone or a tablet, may be used as the information processing apparatus.

Here, the wireless profile 213 is information including specific information (such as SSID) of the access point connected via the wireless LAN, authentication information (such as password) to be used in authentication processing, and the like. The wireless profile 213 is stored and managed by the CPU 201 executing an OS (not illustrated) included in the disk device 202.

Figure 3:
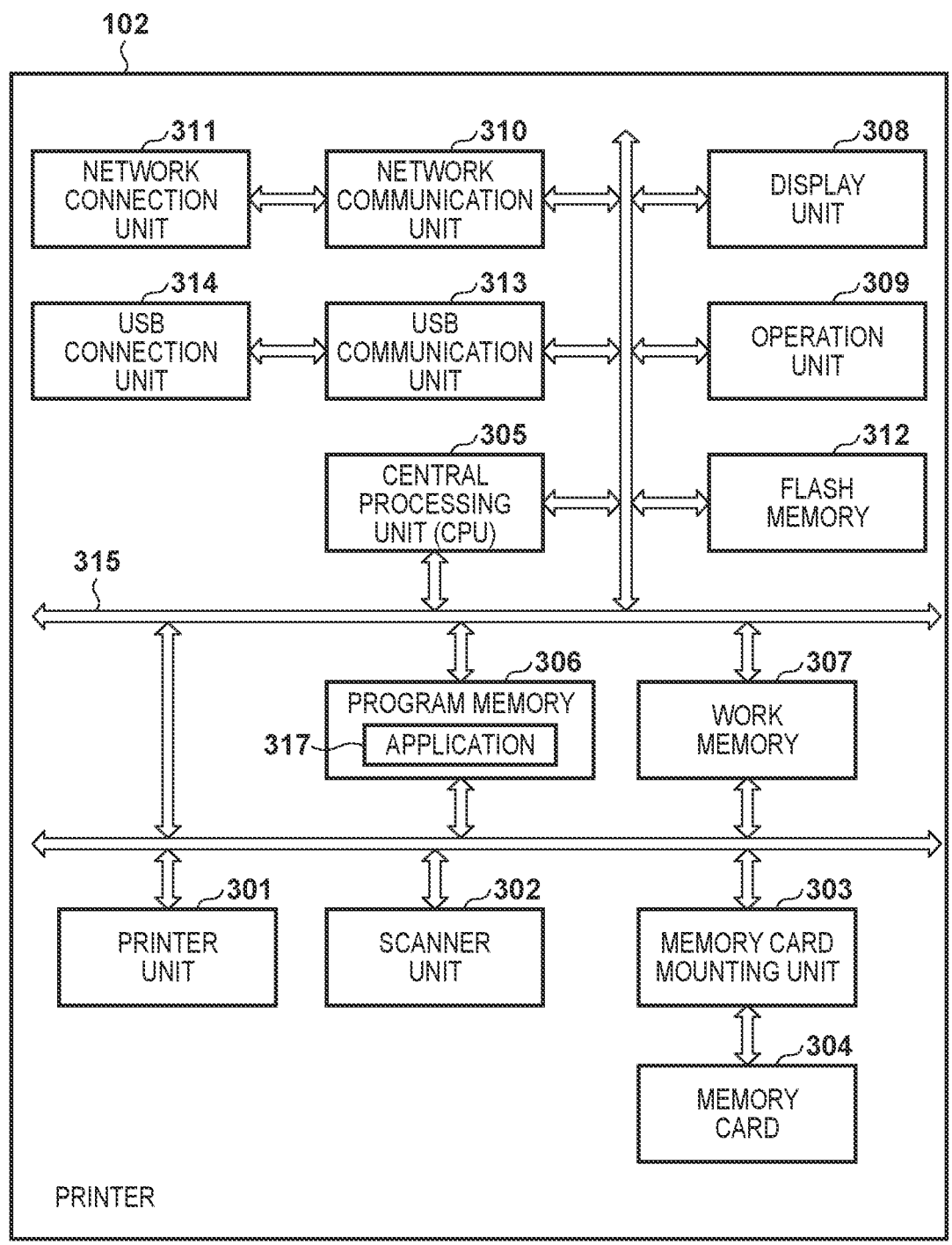
FIG. 3 is a block diagram for explaining an example of a hardware configuration of a printer according to the first embodiment.

FIG. 3 is a block diagram for explaining an example of a hardware configuration of the printer 102 according to the first embodiment.

The printer 102 includes a printer unit 301, a scanner unit 302, and a memory card mounting unit 303 and a memory card 304. The printer 102 also includes a CPU 305, a program memory 306, a work memory 307, a display unit 308, an operation unit 309, a network communication unit 310, a network connection unit 311, a flash memory 312, a USB communication unit 313, and a USB connection unit 314. In the first embodiment, a description will be given using the printer 102, which is a multi-function peripheral, as an example of the image processing apparatus; however, the image processing apparatus may be a copy machine, a fax machine, or the like. Also, the printer may be a printer that is not provided with a scanner function.

In the printer 102, a printing function is realized in the printer unit 301, a scanner function is realized in the scanner unit 302, and a storage function is realized in the memory card mounting unit 303 and the memory card 304. The printer unit 301 prints received image data, image data stored in the memory card 304, and the like on paper (a sheet) in accordance with a printing method, such as an inkjet method or an electrophotographic method. The printer unit 301 also manages ink information including a remaining amount of ink and paper information including the number of sheets of stacked paper.

The scanner unit 302 optically reads an original set on an original platen (not illustrated) and converts the read image into electronic image data. Further, the scanner unit 302 transmits the image data converted to a specified file format to an external device via a network or stores the image data converted to a specified file format in a flash memory 312, a memory card 304, or a storage area (not illustrated), such as an HDD. A copy function is realized by transferring image data generated by reading an original placed on the original platen by the scanner unit 302 to the printer unit 301 and printing the image data on paper by the printer unit 301. Various kinds of file data are stored in the memory card 304 mounted on the memory card mounting unit 303. The file data can be read out from an external device via a network and edited. File data can also be stored in the memory card 304 from an external device.

The CPU 305 is a central processing unit for controlling each unit of the printer 102. The program memory 306 includes, for example, a ROM and the like and stores various kinds of program code, such as firmware for operating the printer, and an application 317 for communicating with a server apparatus. The firmware includes information indicating a Web service to which the printer is permitted to register (information indicating a Web service to which the printer is able to be registered). When the printer 102 is registered to a Web service in accordance with a user instruction, the printer 102 can use the Web service to which the printer 102 has been registered. In addition, it is assumed that the information indicating a Web service to which the printer can be registered includes information as to whether a respective Web service is a necessary Web service for when using the printer. The application 317 has a function of accessing the printer unit 301 to obtain information for consumables, such as ink and paper. The work memory 307 includes a RAM and the like and is used as a deploying area for the application 317 and is also used for temporarily storing and buffering image data, a job log, and the like for when a respective Web service is executed. The display unit 308 includes, for example, a liquid crystal display device or the like and displays various information. The operation unit 309 includes a switch and the like for the user to perform various input operations. The network communication unit 310 connects to the access point 104 via the network connection unit 311. That is, the network communication unit 310 connects to the Internet 100 via the network connection unit 311 and performs various kinds of communication. Regarding each communication, control is performed through a protocol, such as HTTP or XMPP. The network communication unit 310 supports a wired LAN, a wireless LAN, and the like. When the network communication unit 310 supports the wired LAN, the network connection unit 311 is a connector for connecting a wired LAN cable, and when the network communication unit 310 supports the wireless LAN, the network connection unit 311 is an antenna. The flash memory 312 is a non-volatile memory for storing, for example, image data received by the network communication unit 310. The USB communication unit 313 is connected with various peripheral devices (e.g., the PC 101) via the USB connection unit 314 and performs various kinds of communication. Each of the above-described units is connected to each other via a bus 315.

Figure 4:
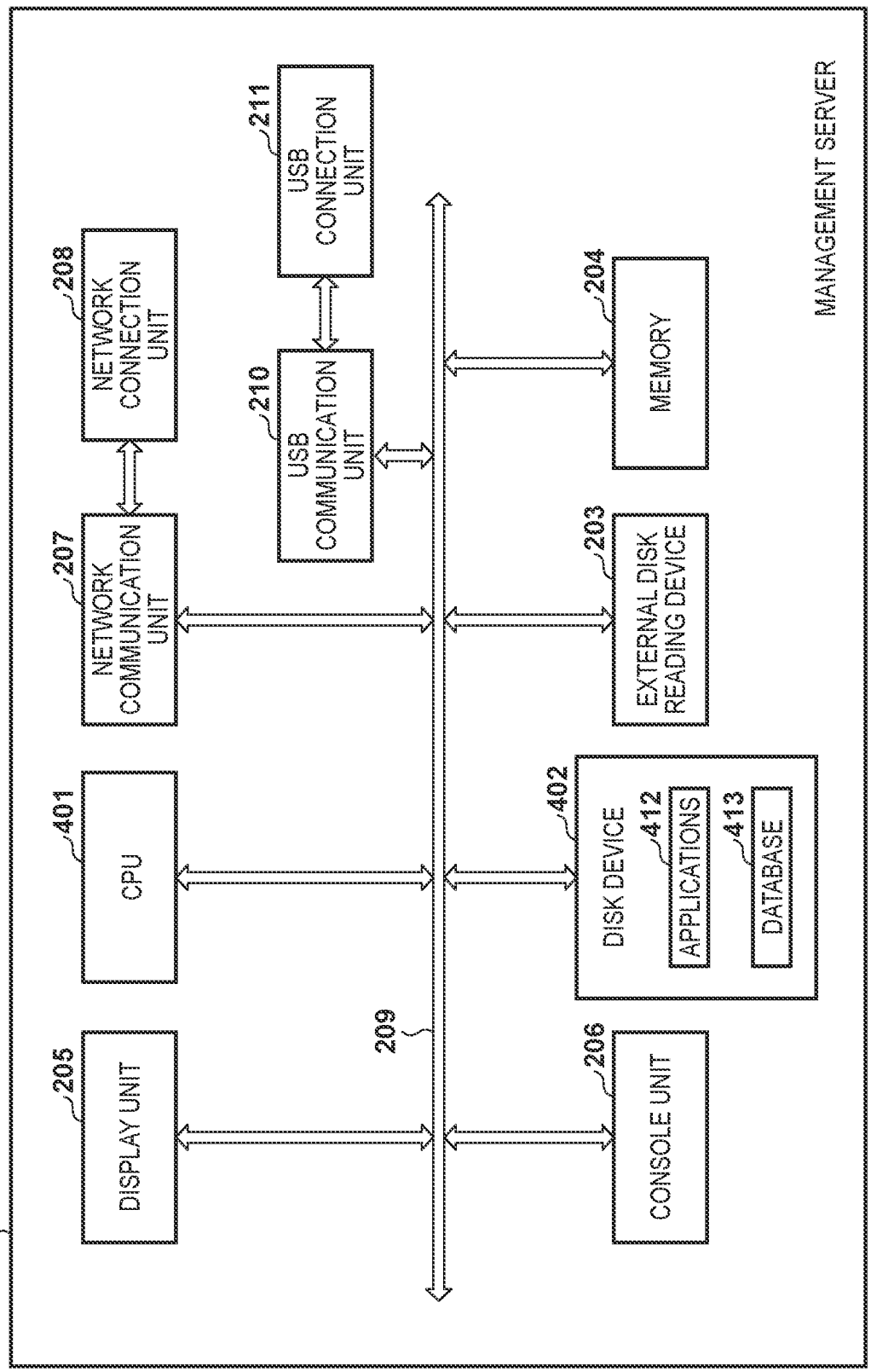
FIG. 4 is a block diagram for explaining a hardware configuration of a management server according to the first embodiment.

FIG. 4 is a block diagram for explaining a hardware configuration of the management server 103 according to the first embodiment. The same reference numerals are assigned to components that realize the same functions as the PC 101 illustrated in FIG. 2, and the descriptions thereof will be omitted.

A CPU 401 controls the operation of the entire management server 103. A disk device 402 of the management server 103 stores, in addition to applications 412, a database 413, and an OS, various kinds of files to be read by the CPU 401.

Next, processing from the start of a set-up of the printer 102 to Web service registration and completion of set-up of the printer 102 will be described.

A description will be given using a flat rate Web service in which the printer 102 is lent to the user and consumables can be provided and replaced for a flat rate in addition to a usage charge for the main unit as an example of a Web service according to the embodiment. In this Web service, an automatic ordering system for consumables in which the printer 102 notifies the management server 103 of remaining amounts of consumables such as ink and paper, and the management server 103 automatically places an order for consumables to a store based on consumables remaining information is used. In this Web service, it is assumed that in order to use the functions of the printer 102 such as printing and scanning, Web service registration is necessary, and the user cannot start using the printer 102 without Web service registration.

The printer 102 periodically communicates with the management server 103 to notify the remaining amounts of consumables such as ink and paper. The management server 103, for example, automatically places an order for consumables, instructs the printer 102 to stop the functions when an upper limit on usage is reached, or bills an additional charge to the user, in accordance with contract details at the time of Web service registration. If the printer 102, for example, is disconnected from the Internet 100 and periodical communication between the printer 102 and the management server 103 is not performed, the printer 102 may stop the functions in order to prevent unauthorized usage.

Next, details of an example of processing from the start of set-up of the printer 102 to Web service registration and completion of set up of the printer 102 will be described. In the following description, the PC 101 is connected to the printer 102 via the USB cable 106 and is in a state in which the PC 101 can communicate with the printer 102. Although the printer 102 is in a state in which the printer 102 is connected to the PC 101 via the USB cable 106, it is assumed that the printer 102 is in a state in which the printer 102 is not connected to the Internet via the access point 104.

The obtainment and installation of a printer driver in the embodiment is performed by a set-up application, which is one of the applications 212 stored in the disk device 202 of the PC 101. Also, processing for connecting the printer 102 to the Internet 100 and processing for Web service registration is performed by a registration application, which is also one of the applications 212. Advantages of thus performing the processing necessary for the PC 101 to use the printer 102 and the processing necessary for using the Web service in different applications will be described.

For example, after the user has performed a set-up and started to use the printer 102, if it newly becomes possible for the printer 102 to use a Web service due to a firmware update of the printer 102, it is possible for the user to additionally perform processing for using the Web service using only the registration application.

In addition, when, for example, resuming the use of a Web service after temporarily unregistering from the Web service, it is possible to perform Web service registration by using only the registration application. As described above, when the printer 102 can be registered to a Web service after the completion of the set-up, the processing to be performed by the set-up application can be omitted, and so the use of the Web service can be started or resumed in a shorter time.

Figure 5:
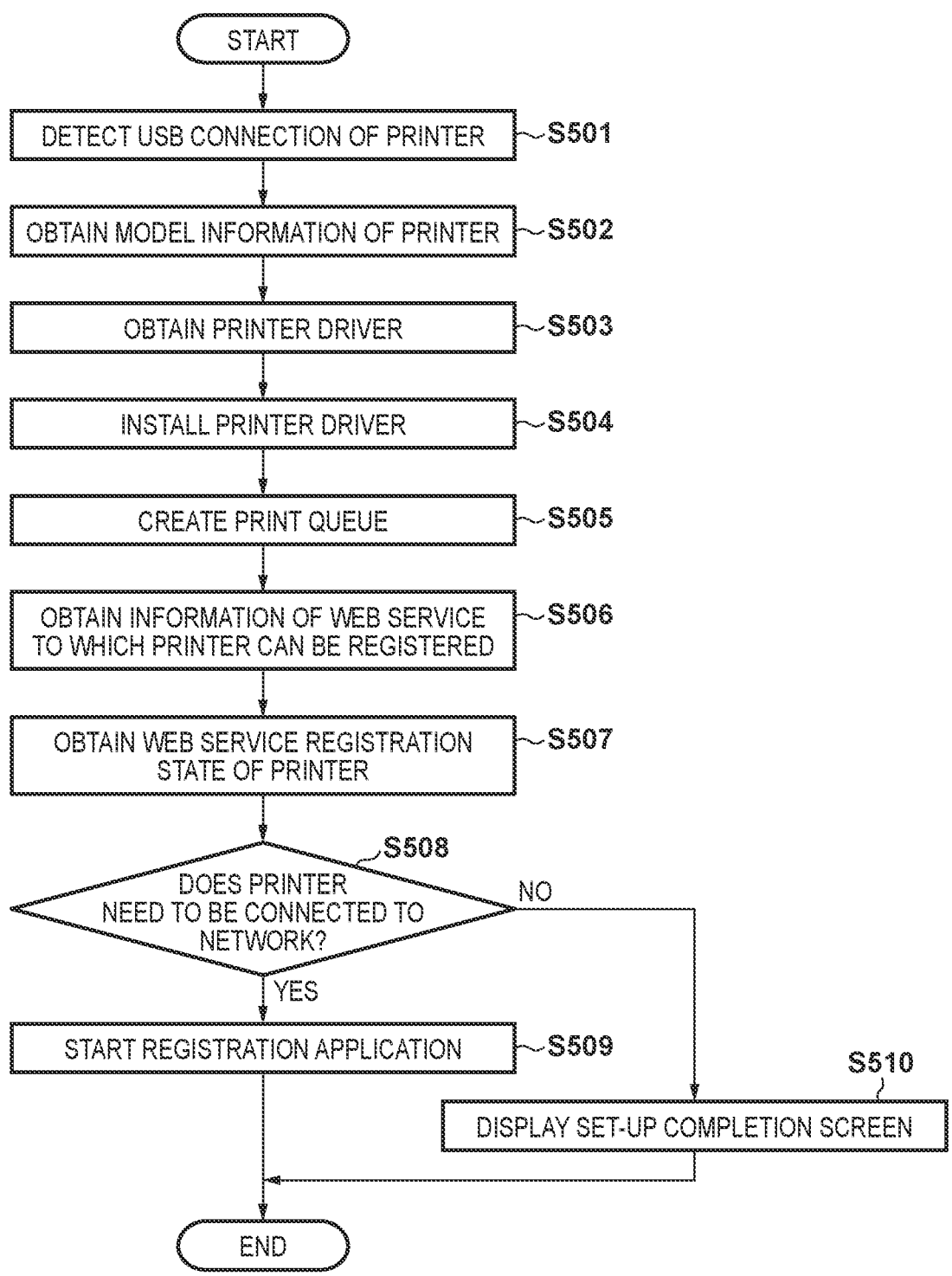
FIG. 5 is a flowchart for explaining an example of processing to be realized by a CPU of the PC according to the first embodiment executing a set-up application.

FIG. 5 is a flowchart for explaining an example of processing to be realized by the CPU 201 of the PC 101 according to the first embodiment executing the set-up application. The processing to be described in this flowchart is realized by the CPU 201 reading out from the disk device 202 and deploying in the memory 204 the set-up application, which is one of the applications 212 and then executing that deployed program.

In step S501, the CPU 201 detects that the printer 102 is connected via the USB cable 106. Next, the processing proceeds to step S502, and the CPU 201 communicates with the printer 102 via the USB cable 106 and obtains model information of the printer 102. The processing then proceeds to step S503, and the CPU 201 obtains an appropriate printer driver based on the model information of the printer 102 obtained in step S502. A method of obtaining the printer driver includes a method of downloading the printer driver that coincides with the model information from a Web server via the Internet and, if one or more printer drivers are included in the set-up application, a method of obtaining the printer driver that coincides with the model information from the included printer drivers. The processing then proceeds to step S504, and the CPU 201 installs the obtained printer driver on the PC 101.

Next, the processing proceeds to step S505, and the CPU 201 creates a print queue associated with the printer driver. The print queue created here is a print queue associated with the USB port detected in step S501. The PC 101 can then transmit via the created print queue image data to the printer 102 connected to the PC 101 via the USB cable 106 and transmit a print instruction.

Next, the processing proceeds to step S506, and the CPU 201 communicate with the printer 102 via the USB cable 106 and obtains information (information indicating a Web service to which the printer is able to be registered) of a Web service that will be available by registering the printer 102 to the Web service. It is assumed that the information indicating the Web service to which the printer is able to be registered obtained here is stored in advance in the program memory 306 of the printer 102. The processing then proceeds to step S507, and the CPU 201 obtains from the printer 102 information (information of registration state of the Web service) indicating whether the printer 102 has already been registered to the Web service to which the printer 102 is able to be registered, which has been obtained in step S506. The registration state obtained here is information indicating whether the printer 102 is in a state in which it is already able to use the Web service. Regarding the state, "service usage preparation in progress", "a state in which the service can be used", "a state in which service usage is stopped", and the like are conceivable as an example. It is assumed that the Web service registration state is stored in advance in the program memory 306 of the printer 102. If the processing for registering the printer 102 to the Web service is executed by the management server 103 and the Web service registration state is changed, the printer 102 obtains a notification for a change in the registration state from the management server 103. Then, in response to the change notification, the Web service registration state stored in the program memory 306 of the printer 102 can be changed.

The processing then proceeds to step S508, and the CPU 201 determines whether the printer 102 needs to be connected to the Internet 100 based on whether the printer is able to be registered to the Web service and the state of Web service registration, which have been obtained in step S506 and step S507. Specifically, the CPU 201 determines whether a Web service to which the printer 102 is able to be registered, which has been obtained in step S506, is a Web service that is necessary to use the printer 102. Then, if the CPU 201 determines that the Web service is necessary and the Web service registration state obtained in step S507 is an unregistered state, the CPU 201 determines that the printer 102 needs to be connected to the Internet 100. Meanwhile, if the CPU 201 determines in step S506 that there is no Web service to which the printer is able to be registered or that the Web service to which the printer is able to be registered is not necessary for using the printer 102, or if the state of Web service registration obtained in step S507 indicates that the printer has already been registered to the Web service, the CPU 201 determines that an Internet connection is unnecessary for the set-up of the printer 102.

In step S508, if the CPU 201 determines that the printer 102 needs to be connected to the Internet 100, the CPU 201 determines that the processing necessary for using the printer 102 has not been completed and the processing proceeds to step S509. In step S509, the CPU 201 starts the registration application for performing processing for Internet connection and Web service registration of the printer 102 and then terminates the processing. At that time, if the registration application has already been installed on the PC 101, the registration application may be directly started, or the registration application may be downloaded from the Web server in order to obtain the most recent registration application, installed on the PC 101, and then started. Alternatively, a form may be taken in which the set-up application displays a Web registration application download page and in which a registration application installer is downloaded, the registration application is installed onto the PC 101, and the installed registration application is started by respective operations performed by the user.

Meanwhile, in step S508, if the CPU 201 determines that the printer 102 does not need to be connected to the Internet 100, the CPU 201 determines that the processing necessary for using the printer 102 has been completed and the processing proceeds to step S510. In step S510, the CPU 201 displays a screen for notifying the user that the set-up has been completed such as the screen illustrated in FIG. 6 and terminates the processing.

Figure 6:
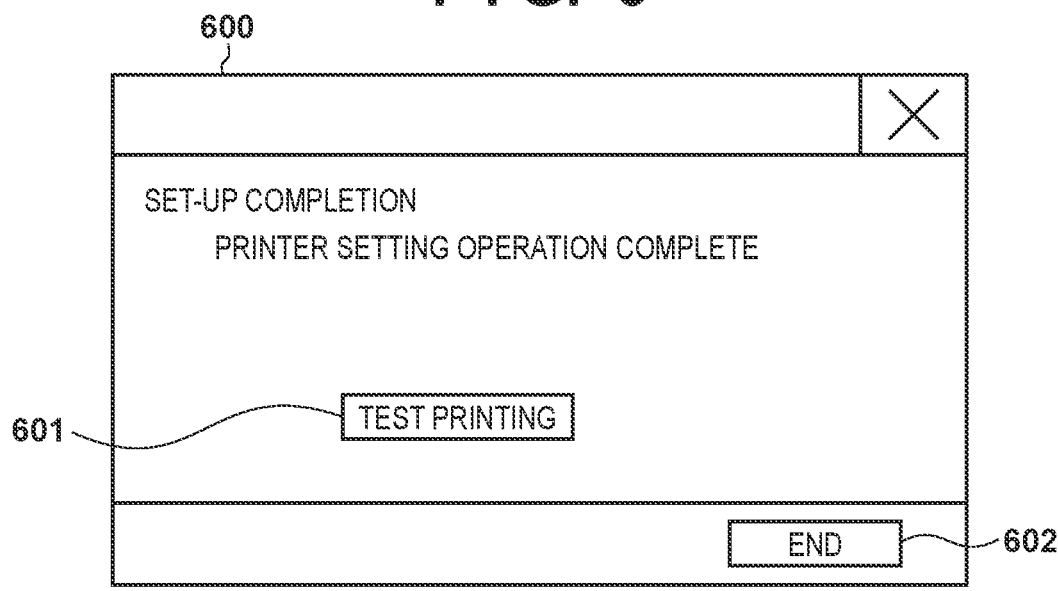
FIG. 6 depicts a view illustrating an example of a set-up completion screen to be displayed on a display unit of the PC according to the first embodiment.

FIG. 6 depicts a view illustrating an example of a set-up completion screen 600 to be displayed on the display unit 205 of the PC 101 according to the first embodiment.

The user can then press a test printing button 601 provided on the screen to cause the printer 102 to perform test printing and confirm that the set-up of the printer 102 has been completed. Also, upon detection that an end button 602 provided on the screen has been pressed, the set-up application is ended.

Figure 7:
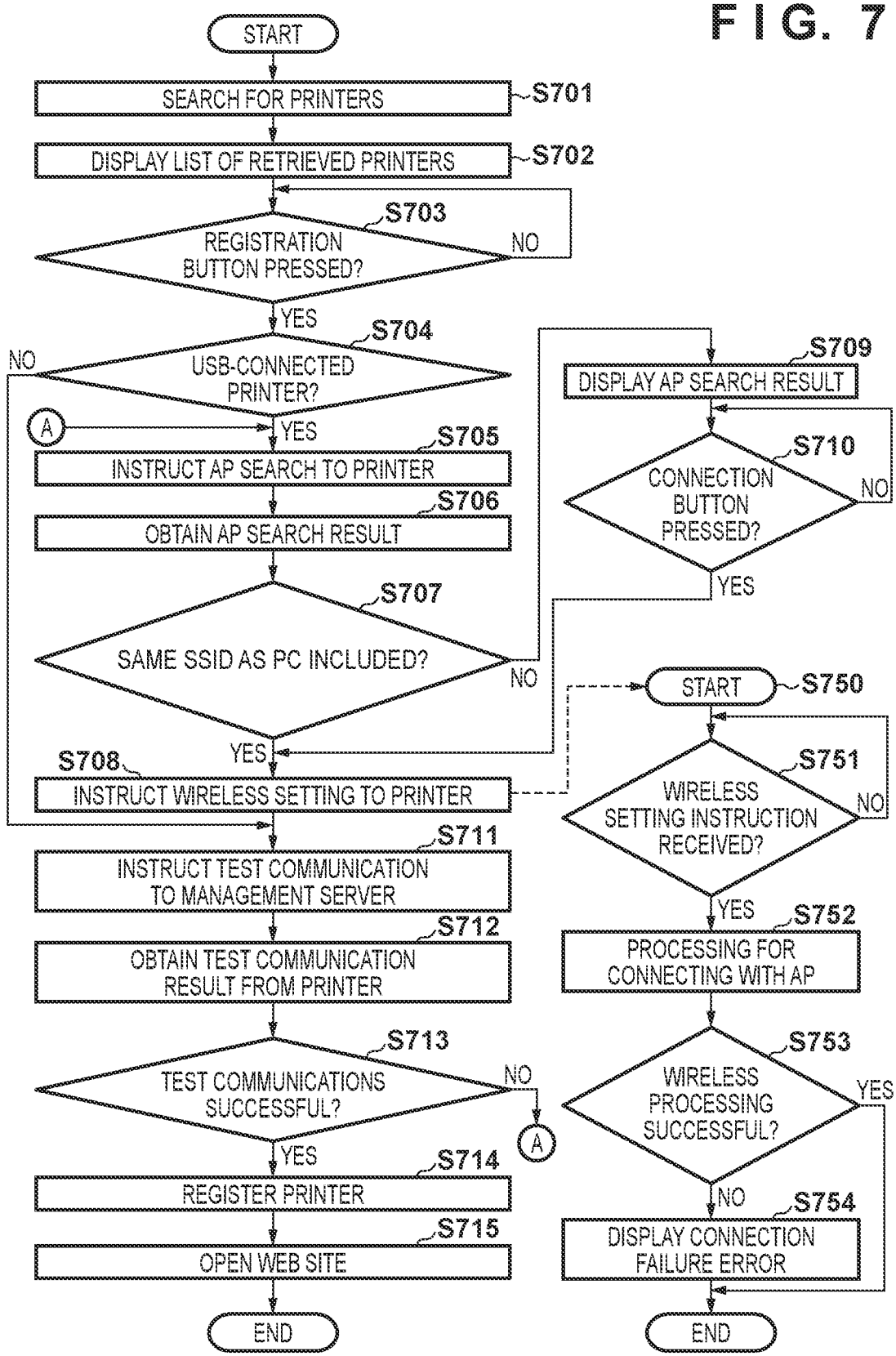
FIG. 7 is a flowchart for explaining processing to be realized by the CPU of the PC according to the first embodiment executing a registration application.

FIG. 7 is a flowchart for explaining processing to be realized by the CPU 201 of the PC 101 according to the first embodiment executing the registration application. The processing to be described in this flowchart is realized by the CPU 201 reading out from the disk device 202 and deploying in the memory 204 the registration application, which is one of the applications 212 and then executing that deployed program.

In step S701, the CPU 201 searches for printers that are connected to the PC 101 (printers belonging to a network to which the PC 101 belongs). The network to which the PC 101 belongs is a network formed by a USB, a wireless LAN, or a wired LAN to which the PC 101 is connected. Therefore, the processing for searching for printers executed at this time is executed in relation to printers that are connected to the PC 101 via the network. Next, the processing proceeds to step S702, and the CPU 201 displays a list of printers detected in step S701.

FIG. 8 is a diagram illustrating an example of a screen for displaying a list of printers retrieved by the PC 101 according to the first embodiment.

A list screen 800 includes a printer detection result list 801, and the printer detection result list 801 displays a list of printers connected to the PC 101, including the printer 102 connected by the USB cable 106. In order to perform on the printer 102 the process of connecting to a wireless LAN and the process of registering to the Web service, the user selects a printer 802 displayed in the printer detection result list 801 and presses a registration button 803.

In step S703, the CPU 201 waits for the registration button 803 of the list screen 800 to be pressed, and upon detecting that the registration button 803 has been pressed, the processing proceeds to step S704. In step S704, the CPU 201 determines whether the printer 802 selected in the screen is the printer 102 detected via a USB connection. Here, if the CPU 201 determines that the printer 802 is the printer 102 detected via a USB connection, the processing proceeds to step S705 and the CPU 201 executes the processing for connecting the printer 102 to a wireless LAN (wireless LAN connection processing), which will be described below. In the present embodiment, the wireless LAN connection processing is, specifically, processing for connecting the printer 102 to the access point 104. In the present embodiment, the access point 104 forms a wireless LAN, so the wireless LAN connection processing is, in other words, processing for connecting the printer 102 to a wireless LAN. As described above, in the present embodiment, the access point 104 is connected to the Internet 100. Thus, in other words, the wireless LAN connection processing is also processing for connecting the printer 102 to the Internet 100. Meanwhile, in step S704, if the printer 802 selected from the printer detection result list 801 is a printer detected via a wireless LAN, the processing proceeds to step S711 and the CPU 201 executes processing for test communication with the management server 103, which will be described later, without executing the wireless LAN connection processing. A printer detected via the wireless LAN is, for example, a printer that is connected over a wireless LAN to an access point to which the PC 101 is connected via a wireless LAN. Since the printer connected to an access point to which the PC 101 is connected is likely to be connected to the Internet 100, in the present embodiment, the wireless LAN connection processing is not executed.

In step S705, the CPU 201 transmits an instruction for searching for a neighboring access point (an AP search) to the printer 102. Thus, upon receiving an AP search instruction, the printer 102 searches for a neighboring access point and stores the detected access point information (including an SSID, an encryption method, and a password). Next, the processing proceeds to step S706, and the CPU 201 communicates with the printer 102 via the USB cable 106 and obtains a detected AP search result. Next, the processing proceeds to step S707, and the CPU 201 refers to the wireless profile 213 to determine if information of the access point included in the AP search result includes an SSID included in the wireless profile already held by the PC 101. Specifically, the wireless profile already held by the PC 101 is, for example, a wireless profile of the access point 104 to which the PC 101 is currently connected or a wireless profile of an access point to which the PC 101 has previously connected. If it is determined here that there is an SSID included in the wireless profile already held by the PC 101, the processing proceeds to step S708, and the CPU 201 transmits information for instructing wireless settings to the printer 102. Specifically, the CPU 201 transmits information of an access point (including an SSID, an encryption method, and a password) included in the wireless profile already held by the PC 101 to the printer 102 via the USB cable 106 and the processing proceeds to step S711.

Meanwhile, in step S707, if the CPU 201 determines that there is no wireless profile, including the SSID, already held by the PC 101, the processing proceeds to step S709 and the CPU 201 displays, for example, a screen 900 for displaying AP search results obtained by the printer 102 as illustrated in FIG. 9.

FIG. 9 is a diagram illustrating an example of a screen 900 for selecting an access point to be displayed on the display unit 205 of the PC 101 according to the first embodiment.

The screen 900 displays an SSID and an encryption method of an access point from among pieces of the information of the obtained plurality of access points as the AP search result obtained by the printer 102. On the screen 900, the user selects an access point 901 to which the printer 102 is to be connected, enters a password of the selected access point 901 in a password input field 902, and presses a connection button 903.

In step S710, the CPU 201 waits for the connection button 903 to be pressed on the screen 900 of FIG. 9, and when the connection button 903 is pressed, the CPU 201 advances the processing to step S708. In this case, in step S708, the CPU 201 transmits information of the access point 901 including an SSID and an encryption method displayed on the screen 900 and a password to the printer 102 via the USB cable 106 and instructs the printer 102 to perform wireless setting.

Next, processing for wireless setting of the printer 102 will be described with reference to step S750 to step S754.

In step S750, the printer 102, which has received the instruction for wireless setting issued by the PC 101 in step S708, starts the wireless setting processing. The processing is realized by the CPU 305 of the printer 102 deploying in the work memory 307 and executing the application 317 of the program memory 306.

In step S751, the CPU 305 of the printer 102 waits to receive the instruction for wireless setting from the PC 101, and upon receiving the instruction for wireless setting, the processing proceeds to step S752. In step S752, the CPU 305 performs the processing for connecting to the access point 104 specified by the PC 101. Specifically, the printer 102 attempts to connect to the access point 104 using an SSID, a password, and an encryption method included in the wireless profile received from the PC 101. The processing then proceeds to step S753, and the CPU 201 determines whether the connection processing has been successful (whether a connection between the printer 102 and the access point 104 has been established). Here, when the connection processing is successful, the processing is terminated, and when it is determined that the connection processing has failed, the processing proceeds to step S754, and the CPU 305 displays a setting failure error (not illustrated) in the display unit 308 of the printer 102. Then, by the user performing an operation for cancelling the setting failure error (not illustrated) displayed on the display unit 308 of the printer 102, the printer 102 terminates the processing for wireless setting.

The description of the processing of the PC102 is returned to again.

After instructing the printer 102 to perform the wireless setting processing in step S708, the processing proceeds to step S711, and the CPU 201 instructs the printer 102 via the USB cable 106 to perform a test communication for verifying whether communication with the management server 103 is possible. At this time, if, for example, the printer 102 is executing the above wireless setting processing and is in a state in which it cannot accept the instruction for test communication, the printer 102 returns a response that it is in a busy state to the PC 101. When the CPU 201 detects that the printer 102 is in a busy state as a response to the test communication, the CPU 201 instructs the printer 102 to perform the test communication again after a predetermined interval.

The processing then proceeds to step S712, and the CPU 201 obtains a result of the test communication from the printer 102 via the USB cable 106. The printer 102 may simply return a response indicating a success or a failure to the PC 101, and if unsuccessful, the printer 102 may return an error value corresponding to a cause thereof. A case where the wireless setting processing has failed or communication with the management server 103 is blocked due to a restriction of the Internet 100 or the access point 104 to which the printer 102 is connected and the like is conceivable as an example of a test communication failure.

The processing proceeds to step S713, and the CPU 201 determines the result of the test communication received from the printer 102. If it is determined here that the test communication is successful, the processing proceeds to step S714, and the CPU 201 executes the registration processing for registering the printer 102 to the management server 103. Specifically, the CPU 201 communicates with the management server 103, transmits identification information of the printer 102, such as a serial number of the printer 102, and proceeds to step S715.

Thus, the database 413 of the management server 103 records the identification information of the printer 102, and the PC 101 enters a preparation state for Web service registration. Depending on a type of Web service, additional information necessary for using the Web service, such as the user's address and credit card information, may also be recorded in the database 413 in association with the identification information of the printer 102. These pieces of additional information may be inputted at the time of purchase of the printer or may be inputted after the processing of the registration application in the embodiment has been terminated. After all the pieces of information necessary for using the Web service has been registered to the management server 103, the printer 102 enters a state in which it is able to use the Web service. The registration process to be performed by the management server 103 may be in a format in which it is performed by the management server 103 alone or the entire system configured by a plurality of servers.

Meanwhile, in step S713, if the CPU 201 determines that the test communication has failed, the CPU 201 advances the processing to step S705 in order to connect the printer 102 to another access point and redoes the wireless LAN connection processing from the beginning. In step S715, the CPU 201 displays a Web site providing the Web service in the display unit 205 and terminates the processing.

By the above processing, the user can ascertain on the displayed Web site that the Web service registration of the printer 102 has been completed and that the functions of the printer 102 have become available. Also, depending on the type of Web service, input of additional information necessary for using the Web service, such as the user's address and credit card information, can be accepted on the Web site.

This concludes a series of processes from a set-up start of the printer 102 to Web service registration and a set-up completion of the printer 102.

As described above, according to the first embodiment, it becomes possible to automatically start the registration application and perform processing for registering a printer to a Web service in a case where it is necessary to connect the printer to the Internet at the time of execution of a printer set-up.

Second Embodiment

In the above-described first embodiment, a description has been given using as an example a case where the PC 101 and the printer 102 are connected by USB and the set-up of the printer 102 is performed by the set-up application, and the wireless LAN connection and the Web service registration of the printer 102 are performed by the registration application. That is, a form in which a plurality of applications with different roles are used has been described.

In contrast to this, in a second embodiment, a description will be given using as an example a case where the PC 101 and the printer 102 are connected via the USB and a form in which the set-up, the wireless LAN connection, and the Web service registration of the printer 102 are all performed in the same application. Since the system configuration and the hardware configurations and the like of the PC 101, the printer 102, and the like according to the second embodiment are the same configuration as in the above-described first embodiment, the descriptions thereof will be omitted.

Figure 10:
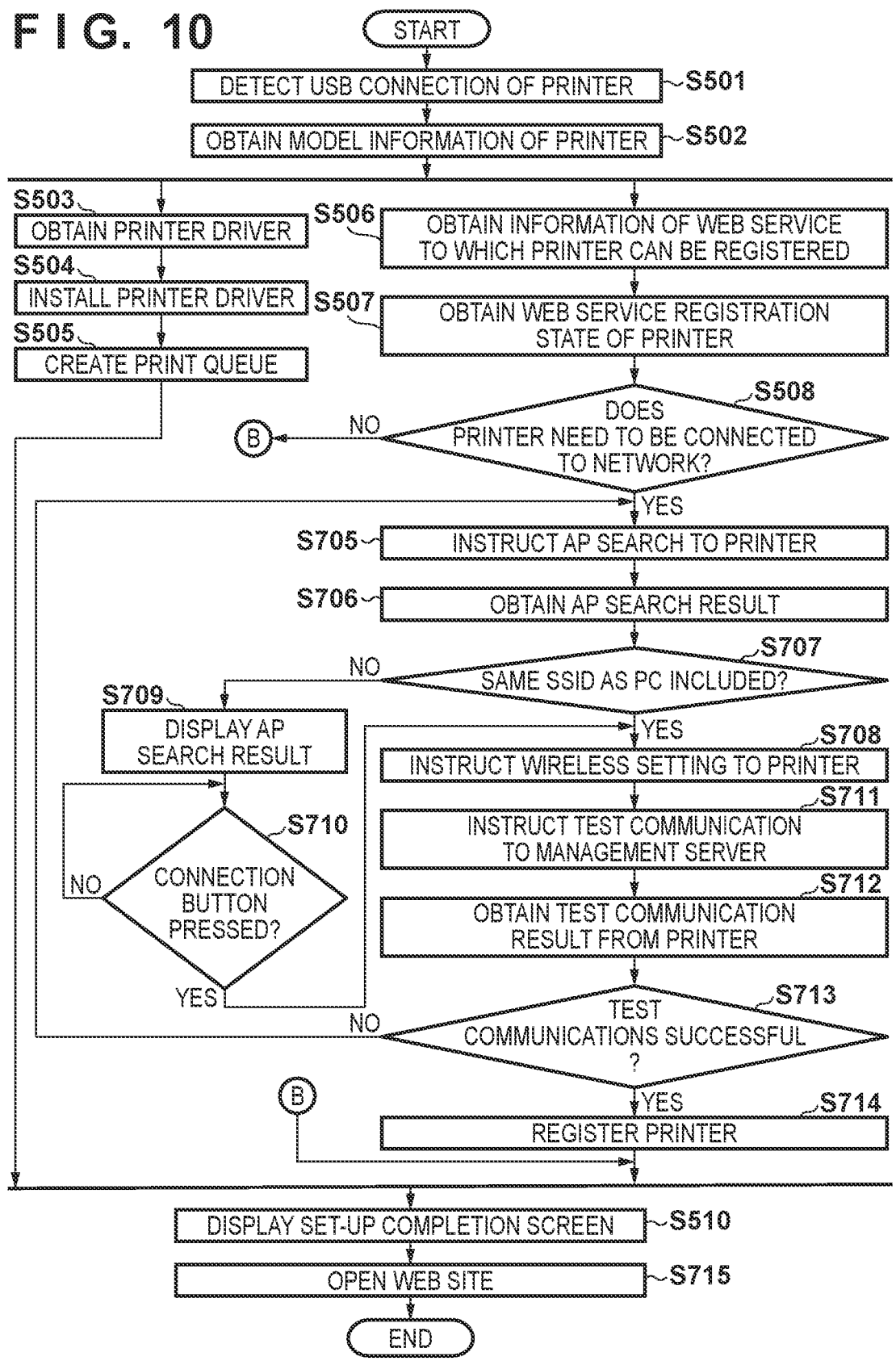
FIG. 10 is a flowchart for explaining processing from a set-up start to Web service registration and a set-up completion of a printer by a PC according to a second embodiment of the present invention.

FIG. 10 is a flowchart for explaining processing by the PC 101 according to the second embodiment of the present invention from a start of set-up to Web service registration and a completion of set-up of the printer 102. In FIG. 10, the same reference numerals are assigned to the same processes as in the above-described flowcharts of FIG. 5 and FIG. 7, and the descriptions thereof will be omitted. The processing indicated in this flowchart is realized by the CPU 201 of the PC 101 executing the above-mentioned same application.

First, in step S501, the CPU 201 detects a connection of the printer 102 connected via the USB cable 106, and in step S502, the CPU 201 obtains model information. Then in step S503 to step S505, the CPU 201 executes processing for obtaining and installing a printer driver and processing for creating a print queue. In parallel with this, in step S506 to step S508, the CPU 201 determines whether the wireless LAN connection processing of the printer 102 is necessary based on the printer 102's state of being able to register to a Web service and state of registration to a Web service. Further, the CPU 201 sequentially executes the wireless LAN connection processing for the printer 102 in step S705 to step S711 and the processing for test communication for confirming communication between the printer 102 and the management server 103 and the processing for Web service registration indicated in step S712 to step S714.

After the above processing is completed, in step S510, the CPU 201 displays the set-up completion screen 600 for notifying the user that the processing necessary for using the printer 102 has been completed. Then, in step S510, upon detecting that the end button 602 of the set-up completion screen 600 is pressed, the processing proceeds to step S715, and the CPU 201 displays a Web site providing the Web service and terminates the processing.

In the second embodiment, a description has been given for a case where the processing for obtaining and installing a printer driver is executed in parallel with a series of processes for the wireless LAN connection processing and the processing for Web service registration as an example of a form in which all the necessary processes are executed in the same application. However, similarly to the above-described first embodiment, a form may be such that processing for obtaining and installing a printer driver may be performed before the wireless LAN connection processing and the processing for Web service registration or after the wireless LAN connection processing and the processing for Web service registration.

As described above, according to the second embodiment, by executing all the necessary processes in the same application, the user operations (such as a press of the registration button 803 in step S703) can be reduced as compared with the above-described first embodiment, thereby allowing the set-up of the printer 102 and the preparation for Web service usage to be completed in a shorter time.

In the second embodiment, a description has been given using as an example a form in which preparation for printer usage in the PC 101 (i.e., the processing for obtaining and installing the printer driver and processing for creating a print queue) and preparations for Web service usage in the printer 102 (i.e., the wireless LAN connection processing and the processing for registering to the Web service) are executed in parallel. However, an execution sequence of the preparation for printer usage and the preparation for Web service use may be such that the preparation for printer usage comes before as described in the first embodiment or, conversely, may be such that the preparation for Web service usage comes before.

Another Embodiment

In the first embodiment and the second embodiment, descriptions have been given using a form in which the processing for connecting to the printer 102 via a wireless LAN is performed by communication via the USB cable 106. However, the processing may be performed via a P2P connection using, for example, a connection method called wireless ad-hoc connection in which communication is possible only between two devices, without going through the USB cable 106.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-21432, filed Feb. 15, 2022, which is hereby incorporated by reference herein in its entirety.

What is claimed is:

1. An information processing apparatus comprising:
a plurality of communication units capable of communicating with an image processing apparatus;
one or more memories storing instructions; and
one or more processors that execute the instructions to:
obtain information of the image processing apparatus connected via a communication unit that is at least one communication unit of the plurality of communication units and is not connected to an Internet;
determine whether it is necessary to connect the image processing apparatus to a predetermined network connected to the Internet based on the obtained information; in a case where it is determined that it is necessary to connect to the predetermined network, cause the image processing apparatus to execute processing for connecting to the predetermined network, via the at least one communication unit; and in a case that the processing for connecting to the predetermined network by the image processing apparatus completes, register the image processing apparatus to a service intermediated by the predetermined network.

2. The information processing apparatus according to claim 1, wherein the one or more processors are further configured to:
obtain and install a printer driver of the connected image processing apparatus.

3. The information processing apparatus according to claim 1, wherein in the determination, the one or more processors are configured to:
display a list of connected image processing apparatuses and determine whether it is necessary to connect an image processing apparatus selected via the displayed list to the predetermined network.

4. The information processing apparatus according to claim 1, wherein in the determination, the one or more processors are configured to:
in a case where in the image processing apparatus it is necessary to use the service intermediated by the predetermined network and a preparation for using the service is not complete, determine that it is necessary to connect the image processing apparatus to the predetermined network.

5. The information processing apparatus according to claim 1, wherein the processing for connecting to the predetermined network includes processing for causing the image processing apparatus to search for an access point and connect to the access point, and
when executing the processing for connecting to the predetermined network, the one or more processors are configured to:
transmit information including an SSID necessary for connecting to the access point to the image processing apparatus.

6. The information processing apparatus according to claim 5, wherein when executing the processing for connecting to the predetermined network, the one or more processors are configured to:
in a case where information of an access point that has been detected by the search coincides with a wireless profile of the information processing apparatus, cause the processing for connecting to the predetermined network to be executed.

7. The information processing apparatus according to claim 6, wherein when executing the processing for connecting to the predetermined network, the one or more processors are configured to:
in a case where the information of the access point detected by the search does not coincide with the wireless profile of the information processing apparatus, display the information of the access point detected by the search, allow a user to select an access point with which a connection is to be made and transmit information including the SSID necessary for connecting to the selected access point to the image processing apparatus.

8. The information processing apparatus according to claim 1, wherein in the registration, the one or more processors are configured to:
instruct test communication intermediated via the predetermined network to the image processing apparatus, and in a case where the test communication has been successful, determine that the processing for connecting to the predetermined network has been completed.

9. The information processing apparatus according to claim 1, wherein the one or more processors are further configured to:
execute the same first application to obtain information of a connected image processing apparatus, and based on the information, determine whether it is necessary to connect the image processing apparatus to a predetermined network connected to the Internet, and
execute a second application different from the first application to cause the image processing apparatus to execute the processing for connecting to the predetermined network and register the image processing apparatus to a service intermediated by the predetermined network.

10. The information processing apparatus according to claim 1, wherein the one or more processors are further configured to:
execute the same application to obtain information of a connected image processing apparatus; based on the information, determine whether it is necessary to connect the image processing apparatus to a predetermined network connected to the Internet; cause the image processing apparatus to execute the processing for connecting to the predetermined network; and register the image processing apparatus to a service intermediated by the predetermined network.

11. The information processing apparatus according to claim 2, wherein the one or more processors are configured to:
execute in parallel the installation of the printer driver, the determination of whether it is necessary to connect the image processing apparatus to the predetermined network, the causing of the image processing apparatus to execute the processing for connecting to the predetermined network, and the registration to the service.

12. The information processing apparatus according to claim 1, wherein the at least one communication unit performs communication by a USB connection.

13. The information processing apparatus according to claim 1, wherein the at least one communication unit performs communication by a P2P connection according to a wireless ad-hoc connection.

14. The information processing apparatus according to claim 1, wherein the predetermined network is a wireless local area network (LAN).

15. An information processing system including an image processing apparatus, a server, and an information processing apparatus,
the information processing apparatus comprising:
a plurality of communication units capable of communicating with the image processing apparatus;
one or more first memories storing instructions; and
one or more first processors that execute the instructions being configured to:
obtain information of the image processing apparatus connected via a communication unit that is at least one communication unit of the plurality of communication units and is not connected to an Internet;
determine whether it is necessary to connect the image processing apparatus to a predetermined network connected to the Internet based on the obtained information;
in a case where it is determined that it is necessary to connect to the predetermined network, cause the image processing apparatus to execute processing for connecting to the predetermined network, via the at least one communication unit; and when the processing for connecting to the predetermined network by the image processing apparatus completes, register the image processing apparatus to a service intermediated by the predetermined network, and the image processing apparatus comprising:

one or more second memories storing instructions; and one or more second processors that execute the instructions being configured to:

upon accepting an instruction of the processing for connecting to the predetermined network, search for an access point, and notify the information processing apparatus of a result of the search; and establish a wireless connection with a retrieved access point in accordance with an instruction of a wireless setting from the information processing apparatus, wherein when the image processing apparatus successfully establishes the wireless connection, the information processing apparatus registers the image processing apparatus to the server.

16. A method of controlling an information processing apparatus including a plurality of communication units capable of communicating with an image processing apparatus, the method comprising:

obtaining information of the image processing apparatus connected via a communication unit that is at least one communication unit of the plurality of communication units and is not connected to an Internet;

determining whether it is necessary to connect the image processing apparatus to a predetermined network connected to the Internet based on the obtained information;

in a case where it is determined that it is necessary to connect to the predetermined network, causing the image processing apparatus to execute processing for connecting to the predetermined network, via the at least one communication unit; and when the processing for connecting to the predetermined network by the image processing apparatus completes, registering the image processing apparatus to a service intermediated by the predetermined network.

17. A non-transitory computer-readable storage medium storing a program for causing a processor to execute a method of controlling an information processing apparatus including a plurality of communication units capable of communicating with an image processing apparatus, the method comprising:

obtaining information of the image processing apparatus connected via a communication unit that is at least one communication unit of the plurality of communication units and is not connected to an Internet;

determining whether it is necessary to connect the image processing apparatus to a predetermined network connected to the Internet based on the obtained information;

in a case where it is determined that it is necessary to connect to the predetermined network, causing the image processing apparatus to execute processing for connecting to the predetermined network, via the at least one communication unit; and when the processing for connecting to the predetermined network by the image processing apparatus completes, registering the image processing apparatus to a service intermediated by the predetermined network.

* * * * *